A. KRIEG.
TRANSMISSION MECHANISM.
APPLICATION FILED MAR. 26, 1917.

1,298,060.

Patented Mar. 25, 1919.
3 SHEETS—SHEET 1.

Witness:
Leonard W. Novander

Inventor
Alfred Krieg
By Pond & Wilson Attys

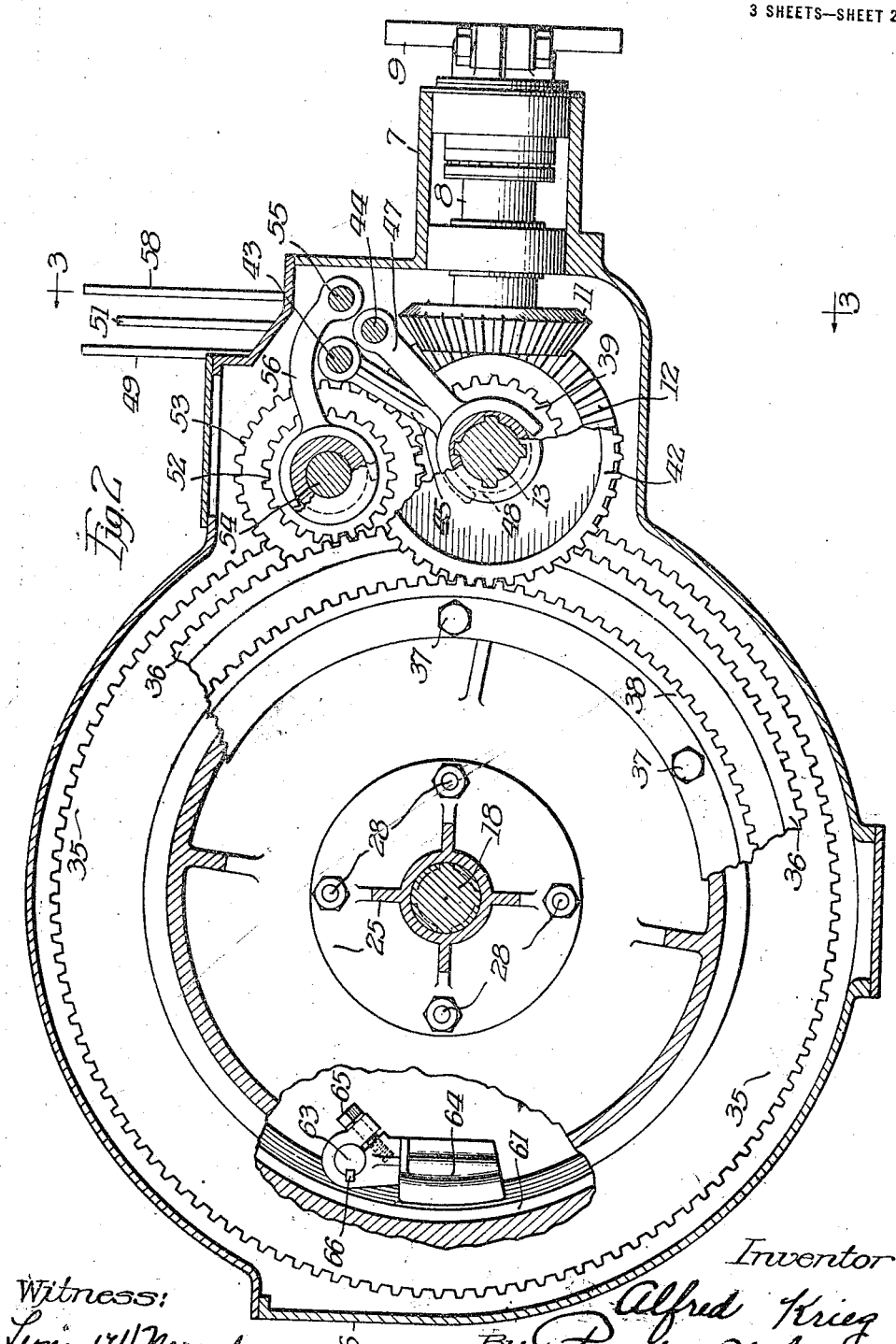

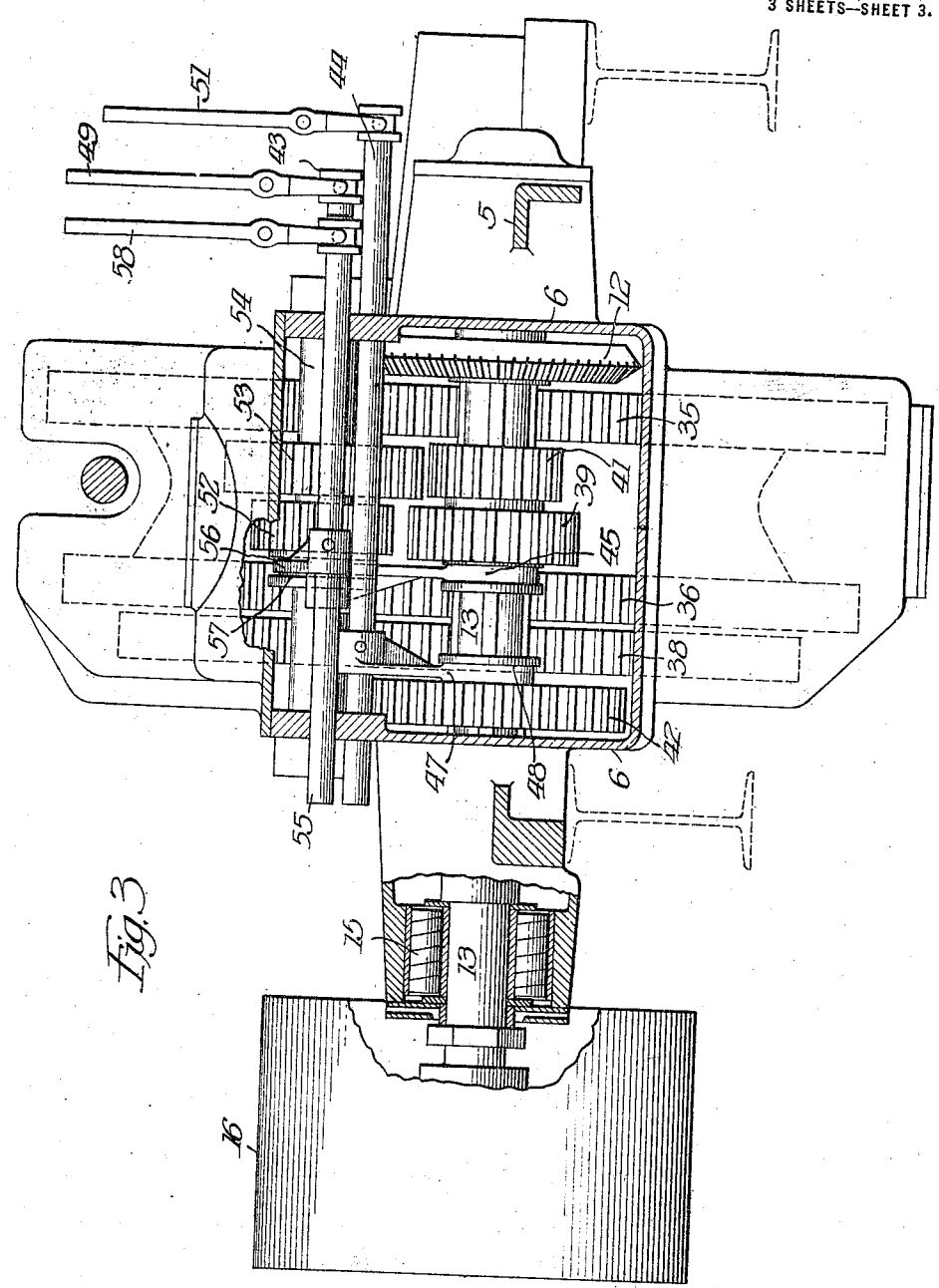

UNITED STATES PATENT OFFICE.

ALFRED KRIEG, OF MINNEAPOLIS, MINNESOTA, ASSIGNOR TO EMERSON-BRANTINGHAM COMPANY, OF ROCKFORD, ILLINOIS, A CORPORATION OF ILLINOIS.

TRANSMISSION MECHANISM.

1,298,060.  Specification of Letters Patent.  Patented Mar. 25, 1919.

Application filed March 26, 1917. Serial No. 157,541.

*To all whom it may concern:*

Be it known that I, ALFRED KRIEG, a citizen of the United States, residing at Minneapolis, in the county of Hennepin and State of Minnesota, have invented certain new and useful Improvements in Transmission Mechanisms, of which the following is a specification.

This invention relates in general to transmission mechanisms, and has more particular reference to a transmission for gas tractors.

One of the primary objects of my present invention is to provide a transmission which will be simple and compact in construction, one which will be strong and durable, and which can be manufactured at a relatively low cost.

Another object of my invention is the provision of a transmission which will be adapted to supply three speeds forward and one speed reverse from a constantly driven power shaft.

A further object of my invention is to provide a novel arrangement of sliding gears which can be easily and quickly manipulated to give the desired speed changes.

Still another object of my invention is to compactly arrange the differential gearing which is connected with the driving members through which power is transmitted independently to the driving wheels of the tractor, within the hub of the driven gears of the transmission, so that the transmission and the differential are compactly arranged as a single driving unit.

Still another object of my invention is to provide a brake which will coöperate with the driven gears of the transmission so that the brake will be applied directly to these gears at a point remote from their center of rotation, with the result that a powerful leverage is exerted by the brake sufficient to effectually control the tractor under any conditions of use.

For the purpose of facilitating an understanding of my invention I have illustrated one preferred embodiment thereof on the accompanying drawings, from an inspection of which, when considered in connection with the following description, my invention and many of its inherent advantages should be readily appreciated. Referring to the drawings,—

Fig. 2 is a vertical sectional view through the construction shown in Fig. 1, certain parts being broken away to more clearly show the underlying elements, and Fig. 3 is a vertical transverse sectional view taken substantially on the line 3—3 of Fig. 2.

Figure 1:
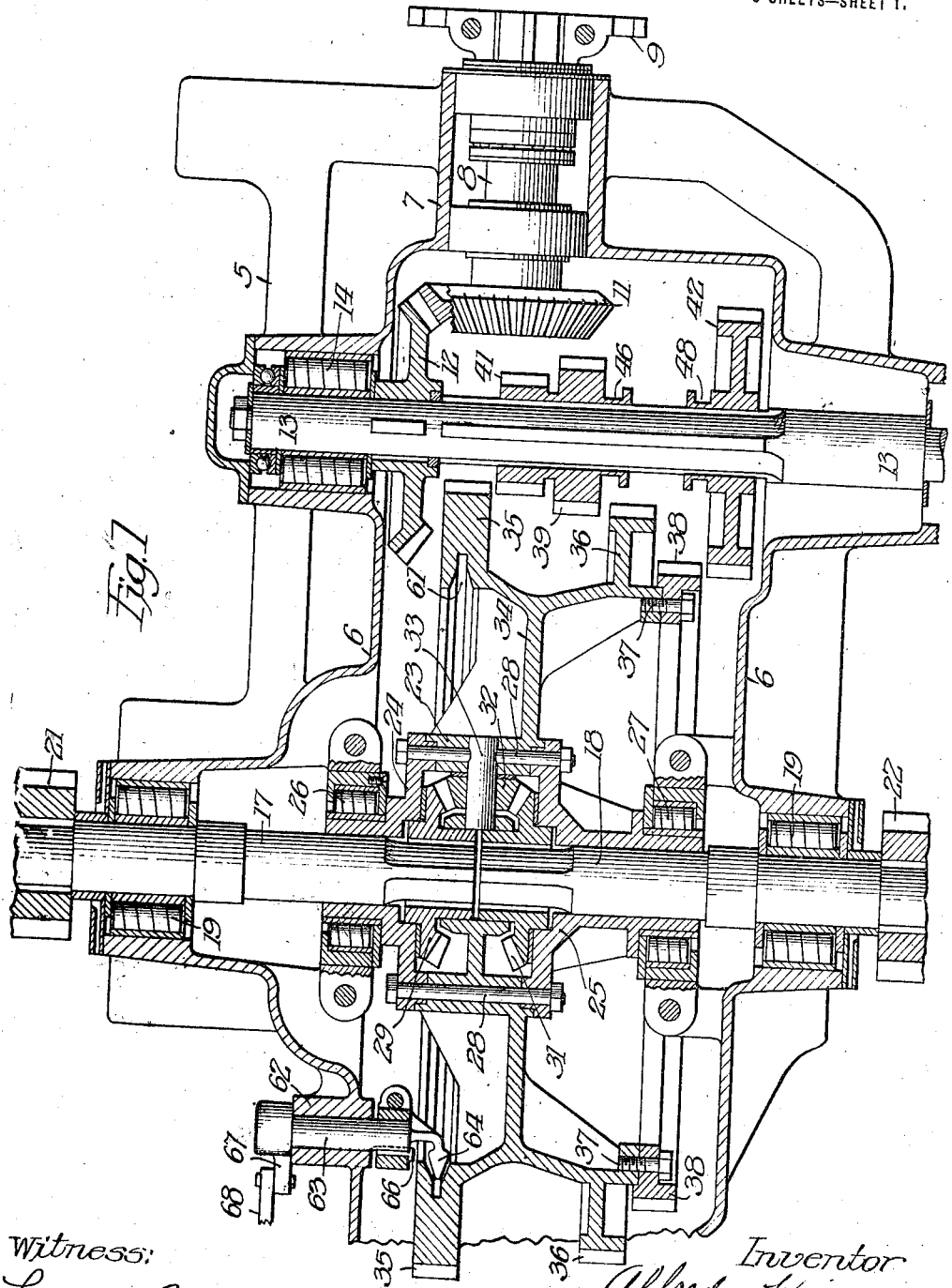
Figure 1 is a horizontal sectional view through a transmission embodying my invention.

Referring to the drawings, reference character 5 indicates generally the frame construction of the transmission which is adapted to be secured by bolts or otherwise to the frame of the tractor, and is shaped to provide a casing 6 of suitable size and shape to accommodate the mechanism hereinafter described.

The forward end of the casing is shaped to provide a longitudinally extending bearing 7, in which is rotatably mounted the shaft 8, the forward end of which is provided with a coupling member 9 adapted to be directly connected to the drive shaft of a longitudinally disposed gas engine mounted upon the tractor frame in front of the transmission. The rear end of the shaft 8 within the casing is equipped with a bevel gear 11 meshing with a companion bevel gear 12 fixed upon a transverse power shaft 13 mounted in roller or other suitable bearings 14 and 15 and carrying at its outer end a belt pulley 16, from which power is transmitted when the tractor is used as a stationary engine. It will be manifest that the shaft 13 is continuously driven from the shaft 8 and when the various parts are in the position shown in Fig. 1 the shaft 13 will revolve idly without transmitting power to the driven members of the transmission mechanism, which will now be described.

Within the rear portion of the transmission casing 6 there is mounted a pair of axially alined shafts 17 and 18 carried near their outer end by roller or other suitable bearings 19 and equipped at their extreme outer ends with driving pinions 21 and 22 respectively, which mesh with and drive the large gears fixedly mounted upon the traction wheels of the machine.

The inner ends of the shafts 17 and 18 project into a revolving housing comprising the center piece 23 and the end pieces 24 and 25 respectively, which are rotatably mounted in roller or other suitable bearings 26 and 27, all as best shown in Fig. 1. The pieces or sections 23, 24 and 25 are rigidly fastened together by means of bolts 28 to form a rigid housing, within which is disposed the differential. The differential consists, in the present instance, of a pair of opposed bevel gears 29 and 31 splined respectively upon the inner ends of the shafts 17 and 18 and meshing with a driving bevel gear 32 which is journaled u, on a stub shaft 33 extending radially inwardly between the bevel gears 29 and 31 from the central member 23 of the housing. It will be obvious that as the housing is revolved the shafts 17 and 18 will be rotated at equal speeds. When the machine is turning a corner or when, for any other reason, greater resistance is offered to one of the pinions 21 or 22 than is offered to the other the differential mechanism will permit relative movement between the shafts so as to compensate for the turning movement or for the unequal resistance offered, thereby acting as differentials customarily act under similar conditions.

The central member 23 of the differential housing is provided with a radially extending strongly reinforced web 34 which carries at its outer periphery a large gear 35 and a smaller gear 36, to the outer face of which there is secured, by bolts 37 or otherwise, a still smaller gear wheel 38. These are the driven gears of the transmission which are driven from the driving shaft 13 at varying speeds through suitable driving gears which will now be described.

A pair of integrally formed gears 39 and 41 of different diameters is splined upon the outer shaft 13 so as to be movable longitudinally along the shaft. These gears are proportioned so as to mesh respectively with the gear 36 and the gear 35. Normally, gears 39, 41 are in the neutral position shown in Fig. 1, in which they do not mesh with either of the driven gears. When it is desired to proceed at low speed the gear 41 is moved into mesh with the gear 35, so that power is transmitted directly from the shaft 13 through gears 41 and 35 to the differential mechanism which drives the shafts 17 and 18. When second speed forward is desired the gears 39 and 41 are moved bodily in the opposite direction until gear 39 meshes with gear 36, whereupon the transmission mechanism is driven at a higher speed from the shaft 13. A third gear 42 is splined upon the shaft 13 and normally assumes the neutral position shown in Fig. 1. When high speed forward is desired gears 39, 41 are moved to neutral position and gear 42 is moved into intermeshing relation with gear 38, whereupon the shafts 17 and 18 are driven at high speed forward, as will be readily understood.

The gears 39, 41 and 42 may be moved longitudinally upon the shaft by any suitable gear-shifting mechanism, but in the present instance I have shown, for purposes of illustration merely, a pair of longitudinally movable rods 43 and 44 suitably mounted in the casing, the rod 43 being provided with a forked arm 45 adapted to engage in a groove 46 formed in the hub of the gear 39, and the rod 44 being equipped with a similar forked arm 47 adapted to engage in a groove 48 formed in the hub of the gear 42. It will be obvious that longitudinal movements of the rods 43 and 44 will shift the driving gears into or out of meshing relation with their respective driven gears. Any suitable or preferred mechanism may be employed for shifting the rods 43 and 44, and this mechanism in practice is located in a convenient position to the driver of the tractor. As illustrating a simple operating mechanism, however, I have shown in Fig. 3, the rod 43 as connected with a pivoted lever 49 and the rod 44 connected to a similar lever 51. Rocking movements of these levers about their pivots will impart the necessary longitudinal movements to the rods.

In order that the tractor may be reversed without reversing the engine I have provided an auxiliary pair of gears, best shown in Figs. 2 and 3. These gears, which are numbered 52 and 53, are cast integral and are slidingly mounted upon a stationary shaft 54 extending transversely of the gear casing above the rotatable shaft 13. Normally these gears are in neutral position, as shown in Fig. 3, but when it is desirable to reverse, the gears are moved to the left on the shaft 54, viewing Fig. 3, until gear 52 meshes with driven gear 36 and gear 53 meshes with driving gear 39. Gear 36, and thereby the differential mechanism and driven shafts, will thus be rotated in a reverse direction from the direction in which they are rotated when the driving gear 39 meshes directly with the gear 36.

For the purpose of shifting the reverse gears I have provided another longitudinally movable rod 55, which is equipped with a bifurcated arm 56 engaging in a groove 57 formed in the hub of the gear 52. A shifting lever 58, or other preferred mechanism, will be employed for imparting longitudinal movement to the shifting rod 55.

In order to obtain a long leverage and a very effective brake for the mechanism above described, and a brake which will be much simpler and more certain in operation than the ordinary band brakes heretofore employed, I have provided a brake mechanism which coöperates directly with the driven gears, and which will now be explained. Referring to Figs. 1 and 2, it will be observed that the inner periphery of the gear 35 outside the carrying web 34 is provided with a rather deep wedge-shaped groove 61. Adjacent the outer face of the gear 35 I have journaled in a bearing 62 formed in the gear casing a short shaft 63 which has mounted upon its inner end a wedge-shaped brake member or shoe 64, which is preferably secured to the shaft 63 by a clamping bolt 65 and also a key or spline 66. The outer end of the shaft 63 is equipped with a lever 67 to which is attached a link 68 connected with a foot pedal or other device under the control of the operator, by means of which the shaft 63 may be rocked to force the wedge-shaped brake shoe into the groove 61 of the driven gear. The wedging action of the block or shoe 64 produces a very strong braking action, which is further augmented by the fact that the point of application of the brake power is a considerable distance from the center of rotation of the driven gears, thereby affording a long leverage, which results in a most effective braking action.

It is believed that my invention in one of its preferred embodiments and its mode of operation will be understood from the foregoing without further description, and it should be manifest that various changes in the structural details illustrated and described may be resorted to without departing from the essence of the invention as defined in the following claims.

I claim:

1. In a transmission mechanism, the combination of a longitudinally extending driving shaft, a transverse intermediate shaft connected by bevel gears to the driving shaft, a transverse sectional driven shaft provided with a differential mechanism in longitudinal alinement with the driving shaft, rigidly united first, second and third speed driven gears mounted concentrically on the casing of the differential mechanism at one side of the bevel gear on the intermediate shaft, rigidly united first and second speed driving gears splined on the intermediate shaft between the first and second speed driven gear, an independent third speed driving gear also splined on the intermediate shaft at the outer side of the third speed driven gear, and means for shifting said driving gears into meshing relation with their companion driven gears.

2. In a transmission mechanism of the character described, the combination of a longitudinally extending driving shaft, a transverse intermediate shaft connected by bevel gears to the driving shaft, a transverse sectional driven shaft provided with a differential mechanism connecting the shaft sections, three rigidly united driven gears mounted concentrically on the casing of the differential mechanism at one side of the bevel gear on the intermediate shaft, a pair of rigidly united driving gears splined on the intermediate shaft and interposed between two of the driven gears so as to respectively mesh with their companion driven gears when moved transversely in opposite directions, an independent driving gear splined on the intermediate shaft for meshing with the remaining driven gear, and means for shifting the driving gears transversely into meshing relation with their companion driven gears.

ALFRED KRIEG.